United States Patent [19]

Iino et al.

[11] 4,318,110
[45] Mar. 2, 1982

[54] MULTI-CHANNEL RECORDING INSTRUMENT

[75] Inventors: Kinzo Iino; Ken-Ichiro Ohta; Hiroshi Aibe, all of Tokyo, Japan

[73] Assignee: Watanabe Sokki Kabushiki Kaisha, Tokyo, Japan

[21] Appl. No.: 188,689

[22] Filed: Sep. 19, 1980

[30] Foreign Application Priority Data

Oct. 4, 1979 [JP] Japan .................. 54/128253

[51] Int. Cl.³ .............................................. G01D 9/00
[52] U.S. Cl. ....................................... 346/32; 346/49; 318/625; 318/663; 324/100
[58] Field of Search ............... 346/32, 31, 49, 139 R, 346/139 A, 139 B, 141; 324/113, 100; 318/625, 640, 677, 681, 663, 105

[56] References Cited

U.S. PATENT DOCUMENTS 3,281,685 10/1966 Talbot, Jr. ........................ 346/32
3,389,397 6/1968 Lex, Jr. et al. ................... 346/49 X
3,750,187 7/1973 Keefer ......................... 318/625 X Primary Examiner—L. T. Hix
Assistant Examiner—W. J. Brady
Attorney, Agent, or Firm—Spensley, Horn, Jubas & Lubitz

[57] ABSTRACT

In a multi-channel recording instrument, the reference signal of each channel is floating from the ground level. Therefore, one each isolated power supply means must be provided for each channel. However, when the error signal for each channel is transmitted through a photo-coupler, the circuit after the photo-coupler can be isolated from the biasing voltage of the reference signal, and a common power supply can be used for all the stages after the photo-couplers, including servo-motor drivers, of all the channels. This reduces the size and cost of the power supplies as a whole. The non-linear character of the photo-coupler does not cause a positioning error, since the photo-coupler is in the servo-loop having a sufficiently large gain.

2 Claims, 1 Drawing Figure

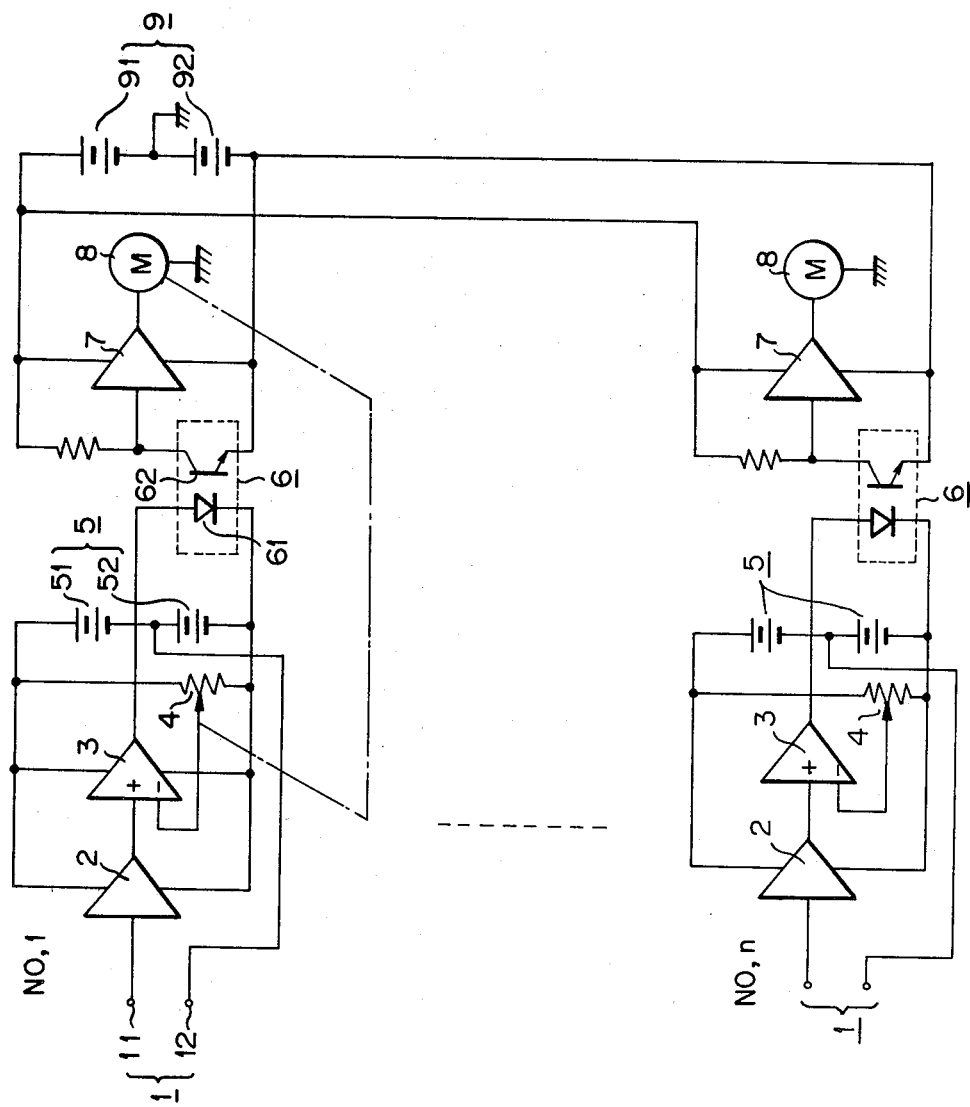

MULTI-CHANNEL RECORDING INSTRUMENT

BACKGROUND OF THE INVENTION

The present invention relates to a multi-channel recording instrument.

In a multi-channel recording instrument, various signals are simultaneously recorded on a same recording paper. There is provided one each channel equipment for each signal of the various signals. For example, when eight signals are to be recorded simultaneously, eight channel equipments are provided. Each channel equipment has a reference signal input means, an error detector means for generating the error signal from the difference between the reference signal and the corresponding feedback signal, a servo-amplifier for amplifying the error signal, a servo-motor driven by the output of the servo-amplifier, and a recording pen which is positioned by the servo-motor. Since the feedback signal is determined by the position of the pen, the position of the pen of a channel is feedback-controlled by the reference signal of the channel.

Generally, all the recording pens of a multi-channel recording instrument move on a same line. When this line is denoted by the X-axis of rectangular coordinates, the paper-feed of the recording paper is in the direction of the Y-axis which is perpendicular to the X-axis.

And, in a multi-channel recording instrument, the biasing voltage of the reference signal may be different for each channel. And, therefore, all the circuits which are conductively connected to the reference signal input terminal must be connected to a floating power-supply.

In a heretofore known multi-channel recording instrument, all the circuits of each channel equipment, which includes a reference signal input means, an error detector means, a servo-amplifier, and a servo-motor, are connected to a floating power supply of the channel. Since the servo-amplifier and the servo-motor consume a considerable power, the floating power-supply of a channel must have a fairly large capacity. When there are eight channels in a multi-channel recording instrument, eight such floating power-supplies of fairly large capacity must be provided. This makes the whole power-supply system bulky and expensive. This is one of the disadvantages of the heretofore known multi-channel recording instrument.

Another disadvantage is in the mounting of the servo-motors. The potential level of the reference signal in relation to the earth potential may be high, raising the potential level of the floating power-supply to the same height in relation to the earth potential. Therefore, the casing of the servo-motor must not be grounded, because the insulation between the winding and the casing of the motor is not sufficient against the high voltage between the floating power-supply which is connected to the winding and the earth potential. Since the chassis of the instrument must be grounded, the servo-motor must be mounted to the chassis through insulating material which can withstand the voltage between the floating power-supply and the ground. This will increase the assembly cost and the size of the instrument.

SUMMARY OF THE INVENTION

Therefore the important object of this invention is to eliminate these disadvantages of the heretofore known multi-channel recording instrument and to provide an instrument in which the main power-supply can be used in common for all the channels, the one terminal of the main power-supply and the casing of servo-motors being grounded.

Other and further objects, features and advantages of this invention will appear more fully from the following description taken in connection with the drawing.

BRIEF DESCRIPTION OF THE DRAWING

The single drawing is a schematic circuit diagram of an embodiment of this invention.

DESCRIPTION OF THE PREFERRED EMBODIMENT

Referring to the drawing, there is illustrated a schematic circuit diagram of a multi-channel recording instrument having n channels (from No. 1 channel to No.n channel). Since all the channel equipments are the same for all channels, the circuits for channels other than No. 1 channel and No.n channel are omitted in the drawing, and the performance will be explained on No. 1 channel.

In the drawing, 1 indicates the reference signal input means comprising terminals 11 and 12. The reference signal is the voltage difference between these terminals 11 and 12. The voltage difference between the terminal 12 and the earth may be arbitrary, and therefore, when the reference signal is amplified by a preamplifier 2, the power supply 5 for the preamplifier 2 must be a floating power-supply and one terminal of the power-supply 5 must be connected to the terminal 12.

The output of the preamplifier 2 is connected to the non-inverted signal input terminal to an operational amplifier 3. To the inverted signal input terminal of the amplifier 3 is connected the feedback signal from a potentiometer 4. Thus, in this specification, the operating amplifier 3 is called on error amplifier 3, and the connection of the preamplifier 2, the error amplifier 3, and the potentiometer 4 will be called an error detector means. hannel, the neutral terminal of the power-supply being connected to the terminal 12 of the channel.

The output of the error amplifier 3 is connected to the light emitting diode 61 of a photo-coupler 6. The output of the photo-transistor 62 of the photo-coupler 6 is amplified by the servo-amplifier 7 to drive the servo-motor 8. In the photo-coupler 6, the output current is determined by the input voltage, and thus, the error signal is transmitted from the error amplifier 3 to the servo-amplifier 7.

Since the output circuit of the photo-coupler 6 is not conductively connected to its input circuit, the power-supply for the output circuit of the photo-coupler 6 can be connected to any potential level irrespective to that of the input circuit. In the embodiment illustrated in the drawing, a common power supply 9 has a positive voltage power-supply 91 and a negative voltage power-supply 92 with a grounded neutral.

This common power-supply 9 supplies to all the servo-amplifiers 7 (including the output circuits of the photo-couplers 6) and to all the servo-motors 8. In this way, the casing of all the servo-motors 8 can be grounded.

The servo-motor 8 of a channel controls the position of the recording pen to which the position of the sliding contact of the potentiometer 4 of the channel is coupled through an insulated connection. The isolated power-supply 5 which supplies power to the error amplifier 3 is connected to the potentiometer 4, and therefore, the output voltage from the potentiometer 4 is the feedback signal of the channel.

In general, the photo-coupler 6 has a rather poor linearity in the relation between the input voltage and the output current. In the present invention, however, the photo-coupler 6 is in the servo-loop, and therefore, the non-linear relation between the input and the output of the photo-coupler 6 does not cause a positioning error as long as the total gain of the servo-loop is sufficiently large and the gain of the preamplifier 2 is kept constant.

The isolated power-supply 5 of each channel can be made compact, since the power consumption from this power-supply 5 is comparatively small; for example, in the order of one watt per channel. With compact isolated power-supplies for each channel and one single main power-supply 9 in common for all the channels, the total power-supply system of this invention can be made compact and inexpensive.

Moreover, this common power-supply 9 with one terminal grounded, can be used for other purposes. For example, the power-supply 9 can be used for driving the paper-feed motor, or for energizing the relay coils and indicating lamps.

Since the casing of the servo-motor 8 can be grounded, it is easy to shield the interference from the motor current to the circuits in other channels.

Although the invention has been described in its preferred embodiments, various changes and modifications may be made without departing from the spirit and the scope of the invention.

What is claimed is:

1. Multi-channel recording instrument comprising:
   one each channel equipment for each channel, said channel equipment including a reference signal input means, an error detector means to generate an error signal as the difference between the reference signal and a feedback signal of the channel, a servo-amplifier to amplify said error signal, a photo-coupler for transmitting said error signal from the output of said error signal detector means to the input of said servo-amplifier, and a servo-motor driven by the output of said servo-amplifier to control the position of the recording pen of the channel, said feedback signal being determined by said position of said recording pen;
   one each isolated power-supply for each channel equipment, for supplying necessary power to said error detector means of the channel; and
   a common main power-supply for supplying necessary power to all the servo-motors and to all the servo-amplifiers of all the channels.

2. Multi-channel recording instrument in accordance with claim 1, wherein the feedback signal is an output from a potentiometer connected to said isolated power-supply, the position of the sliding contact of said potentiometer being coupled to the position of the recording pen through an insulated connection.

* * * * *